(12) United States Patent
Jeong et al.

(10) Patent No.: US 11,908,999 B2
(45) Date of Patent: Feb. 20, 2024

(54) ELECTROLYTE FOR RECHARGEABLE LITHIUM BATTERY AND RECHARGEABLE LITHIUM BATTERY

(71) Applicants: SAMSUNG SDI CO., LTD., Yongin-si (KR); POSTECH Research and Business Development Foundation, Pohang-si (KR)

(72) Inventors: Myunghwan Jeong, Yongin-si (KR); Younghye Kang, Yongin-si (KR); Haneol Kang, Yongin-si (KR); Dongyoung Kim, Yongin-si (KR); Soojin Kim, Yongin-si (KR); Aeran Kim, Yongin-si (KR); Hoon Kim, Yongin-si (KR); Suyeol Ryu, Yongin-si (KR); Moon Jeong Park, Yongin-si (KR); Jeongmin Shin, Yongin-si (KR); Junyong Lee, Yongin-si (KR); Tae Jin Lee, Yongin-si (KR); Jin-Hyeok Lim, Yongin-si (KR); Wonseok Cho, Yongin-si (KR); Hyunbong Choi, Yongin-si (KR); Jungmin Han, Yongin-si (KR)

(73) Assignees: SAMSUNG SDI CO., LTD., Yongin-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 255 days.

(21) Appl. No.: 17/081,062

(22) Filed: Oct. 27, 2020

(65) Prior Publication Data
US 2021/0135287 A1     May 6, 2021

(30) Foreign Application Priority Data
Oct. 31, 2019    (KR) .................. 10-2019-0138008

(51) Int. Cl.
*H01M 4/00*     (2006.01)
*H01M 10/0567*     (2010.01)
(Continued)

(52) U.S. Cl.
CPC ....... *H01M 10/0567* (2013.01); *C07F 9/3826* (2013.01); *C07F 9/3886* (2013.01);
(Continued)

(58) Field of Classification Search
CPC .. H01M 10/0525; H01M 4/364; H01M 4/366; H01M 4/587; H01M 4/525
See application file for complete search history.

(56) References Cited

U.S. PATENT DOCUMENTS

2004/0142246 A1    7/2004   Han et al.
2012/0244428 A1    9/2012   Park et al.
(Continued)

FOREIGN PATENT DOCUMENTS

CN    108630989 A   *   10/2018   ........ H01M 10/0525
CN    108630989 A       10/2018
(Continued)

OTHER PUBLICATIONS

Shi et al, An Electrolyte And Lithium Ion Battery, Oct. 9, 2018 (Year: 2018).*
(Continued)

*Primary Examiner* — Cynthia H Kelly
*Assistant Examiner* — Monique M Willis
(74) *Attorney, Agent, or Firm* — Lee IP Law, P.C.

(57) ABSTRACT

An electrolyte for a rechargeable lithium battery and a rechargeable lithium battery including the electrolyte, the electrolyte including a non-aqueous organic solvent; a lithium salt; and an additive, wherein the additive includes a compound represented by Chemical Formula 1:

(Continued)

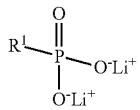

[Chemical Formula 1]

in Chemical Formula 1, $R^1$ is a cyano group, a substituted or unsubstituted C2 to C10 alkenyl group, or a substituted or unsubstituted C2 to C10 alkynyl group.

14 Claims, 4 Drawing Sheets

(51) Int. Cl.
    *C07F 9/38*     (2006.01)
    *H01M 4/36*     (2006.01)
    *H01M 4/38*     (2006.01)
    *H01M 4/505*     (2010.01)
    *H01M 4/525*     (2010.01)
    *H01M 4/587*     (2010.01)
    *H01M 10/0525*     (2010.01)

(52) U.S. Cl.
    CPC ........... *H01M 4/364* (2013.01); *H01M 4/366* (2013.01); *H01M 4/386* (2013.01); *H01M 4/505* (2013.01); *H01M 4/525* (2013.01); *H01M 4/587* (2013.01); *H01M 10/0525* (2013.01); *H01M 2300/0025* (2013.01)

(56) References Cited

U.S. PATENT DOCUMENTS

| | | | |
|---|---|---|---|
| 2014/0134479 A1 | 5/2014 | Kim et al. | |
| 2017/0275311 A1* | 9/2017 | Kotou | C07F 9/4084 |
| 2018/0237461 A1 | 8/2018 | Sakaguchi et al. | |
| 2018/0241036 A1 | 8/2018 | Jo et al. | |
| 2019/0058213 A1* | 2/2019 | Koh | H01M 4/525 |
| 2019/0229338 A1* | 7/2019 | Ho | H01M 4/1393 |
| 2019/0252723 A1 | 8/2019 | Hoecker et al. | |
| 2020/0066463 A1 | 2/2020 | Kinoshita et al. | |

FOREIGN PATENT DOCUMENTS

| | | | | |
|---|---|---|---|---|
| CN | 109428118 A | | 3/2019 | |
| EP | 3598559 A1 | | 1/2020 | |
| JP | 2015-018713 A | | 1/2015 | |
| JP | 5704277 B1 | * | 4/2015 | ............ Y02E 60/10 |
| JP | 2016-066404 A | | 4/2016 | |
| KR | 20090023287 A | * | 3/2009 | ......... H01M 4/1395 |
| KR | 10-2012-0109080 A | | 10/2012 | |
| KR | 10-2017-0063373 A | | 6/2017 | |
| KR | 10-2018-0038476 A | | 4/2018 | |
| KR | 10-2019-0057342 A | | 5/2019 | |
| TW | 201703341 A | * | 1/2017 | ......... H01M 10/052 |
| WO | WO 2018/186068 A1 | | 10/2018 | |

OTHER PUBLICATIONS

Sakaguchi et al, Nonaqueous Electrolyte Solution For Secondary Batteries And Secondary Battery Provided With Same, Jan. 16, 2017 (Year: 2017).*
Odani et al , Anode, Method of Manufacturing Same, Secondary Battery, and Method of Manufacturing Same, Oct. 4, 2009, (Year: 2009).*
Fujino et al. Non-aqueous Electrolyte And Power Storage Device Using The Same, Apr. 2015. See the Abstract. (Year: 2015).*
European Search Report dated Mar. 24, 2021.
Chinese Office action dated Oct. 27, 2023.
Korean Office Action dated Dec. 17, 2023, of the corresponding Korean Patent Application No. 10-2019-0138008.

* cited by examiner

ELECTROLYTE FOR RECHARGEABLE LITHIUM BATTERY AND RECHARGEABLE LITHIUM BATTERY

CROSS-REFERENCE TO RELATED APPLICATION

Korean Patent Application No. 10-2019-0138008, filed on Oct. 31, 2019, in the Korean Intellectual Property Office, and entitled: "Electrolyte for Rechargeable Lithium Battery and Rechargeable Lithium Battery," is incorporated by reference herein in its entirety.

BACKGROUND

1. Field

Embodiments relate to an electrolyte for a rechargeable lithium battery and a rechargeable lithium battery including the same.

2. Description of the Related Art

A rechargeable lithium battery may be recharged and may have three or more times higher energy density per unit weight than a lead storage battery, nickel-cadmium battery, nickel hydrogen battery, nickel zinc battery, or the like, and may be highly charged and may be commercially manufactured for a laptop, a cell phone, an electric tool, an electric bike, and the like. Additional improvements of energy density have been considered.

A rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

SUMMARY

The embodiments may be realized by providing an electrolyte for a rechargeable lithium battery, the electrolyte including a non-aqueous organic solvent; a lithium salt; and an additive, wherein the additive includes a compound represented by Chemical Formula 1:

[Chemical Formula 1]

in Chemical Formula 1, $R^1$ is a cyano group, a substituted or unsubstituted C2 to C10 alkenyl group, or a substituted or unsubstituted C2 to C10 alkynyl group.

$R^1$ may be a cyano group, a substituted or unsubstituted C2 to C4 alkenyl group, or a substituted or unsubstituted C2 to C4 alkynyl group.

$R^1$ may be a cyano group, a vinyl group, a propenyl group, an ethynyl group, or a propynyl group.

The compound represented by Chemical Formula 1 may be represented by Chemical Formula 1A:

[Chemical Formula 1A]

The compound represented by Chemical Formula 1 may be included in an amount of about 0.1 wt % to about 10 wt %, based on a total weight of the electrolyte.

The compound represented by Chemical Formula 1 may be included in an amount of about 0.2 wt % to about 2.0 wt %, based on a total weight of the electrolyte.

The embodiments may be realized by providing a rechargeable lithium battery including a positive electrode including a positive active material; a negative electrode including a negative active material; and the electrolyte according to an embodiment.

The positive active material may include a composite oxide of lithium and cobalt, manganese, nickel, or a combination thereof.

The positive active material may be represented by Chemical Formula 4:

[Chemical Formula 4]

in Chemical Formula 4, x1, y1, and z1 may satisfy the following relations: $0.9 \le x1 \le 1.8$, $0 \le y1 \le 1$, $0 \le z1 \le 1$, and $0 \le y1+z1 \le 1$, and $M^1$, $M^2$ and $M^3$ may be each independently Ni, Co, Mn, Al, Sr, Mg, La, or a combination thereof.

The positive active material may be represented by Chemical Formula 5:

[Chemical Formula 5]

in Chemical Formula 5, x2, y2, and z2 may satisfy the following relations: $1 \le x2 \le 1.2$, $0.6 \le y2 \le 1$, and $0 \le z2 \le 0.5$ (e.g. $0 \le z2 \le 0.4$ or $0 \le z2 \le 0.4$).

The negative active material may include a Si—C composite including a Si active material and a carbon active material.

The negative active material may further include crystalline carbon.

The crystalline carbon may include graphite, and the graphite may include natural graphite, artificial graphite, or a mixture thereof.

The Si—C composite may further include a shell surrounding the surface of the Si—C composite, and the shell may include amorphous carbon.

The amorphous carbon may include soft carbon, hard carbon, a mesophase pitch carbonization product, calcined coke, or a mixture thereof.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, "substituted" refers to replacement of hydrogen of a compound by a substituent selected from a halogen atom (F, Br, Cl, or I), a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a rechargeable lithium battery according to an embodiment is described.

An electrolyte for a rechargeable lithium battery according to an embodiment may include a non-aqueous organic solvent, a lithium salt, and an additive. In an implementation, the additive may include, e.g., a compound represented by Chemical Formula 1.

[Chemical Formula 1]

In Chemical Formula 1, $R^1$ may be or may include, e.g., a cyano group, a substituted or unsubstituted C2 to C10 alkenyl group, or a substituted or unsubstituted C2 to C10 alkynyl group.

The compound represented by Chemical Formula 1 (included in the additive according to an embodiment) includes a lithium source inside the molecule and may be reduced on the surface of the negative electrode and form a strong solid electrolyte interface (SEI) film having excellent ion conductivity thereon. Accordingly, decomposition of the negative electrode surface during the high temperature cycle operation may be suppressed due to an initially formed solid electrolyte interface (SEI) film and thus a resistance increase rate in rechargeable lithium batteries may be reduced.

In an implementation, two —OLi's as the lithium source are included therein, and the compound may have high-rate performance-improving effects, compared with a compound including one —OLi.

In an implementation, a functional group having an unsaturated bond may be included in one molecule and may help induce polymerization of the compound including the lithium source, and the SEI film may be more firmly formed on the surface of the negative electrode.

Figure 2:
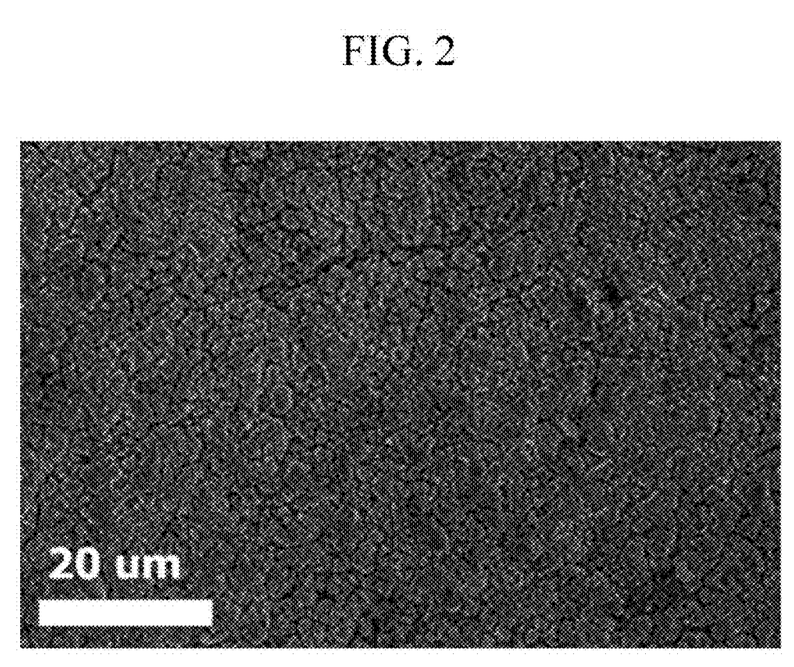
FIG. 2 is a SEM image of an SEI film formed on a surface of a negative electrode when using the electrolyte according to Example 1.

An embodiment of the SEI film formed on the surface of the negative electrode may be seen in FIG. 2.

FIG. 2 is a SEM image of an SEI film formed on a surface of a negative electrode when using the electrolyte according to Example 1.

Figure 3:
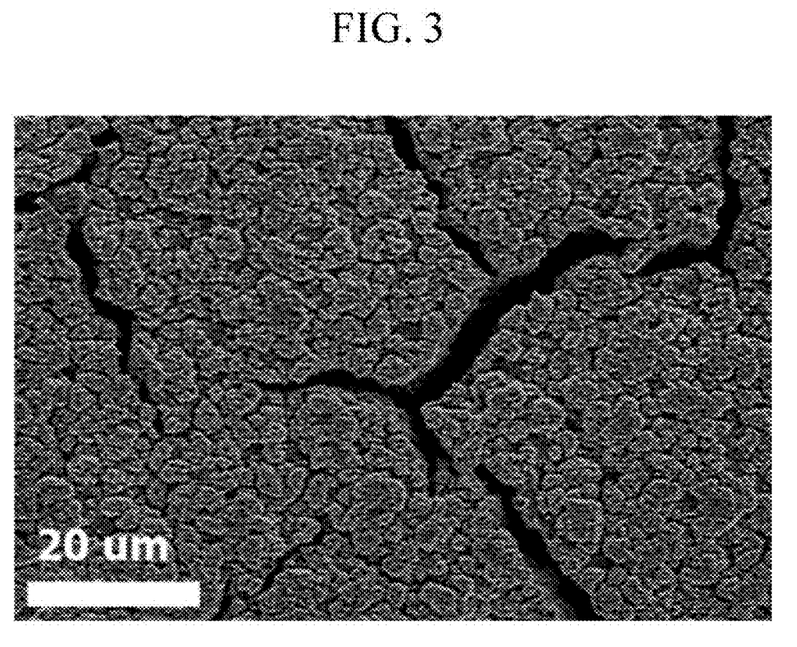
FIG. 3 is a SEM image of an SEI film formed on a surface of a negative electrode when using the electrolyte according to Comparative Example 1.

FIG. 3 is a SEM image of an SEI film formed on a surface of a negative electrode when using the electrolyte according to Comparative Example 1.

Referring to FIGS. 2 and 3, when the electrolyte including the additive according to an embodiment is used, a strong (e.g., solid) SEI film may be formed on the surface of the negative electrode (FIG. 2). When an electrolyte including no additive is used, cracks may occur on the surface of the negative electrode (FIG. 3).

In an implementation, $R^1$ in Chemical Formula 1 may be, e.g., a cyano group, a substituted or unsubstituted C2 to C4 alkenyl group, or a substituted or unsubstituted C2 to C4 alkynyl group.

As the number of carbons of the functional group including an unsaturated bond is smaller, the polymer may become denser, the resistance increase rate of a rechargeable lithium battery may be decreased, and stability thereof during the storage at a high temperature may be improved.

In an implementation, $R^1$ in Chemical Formula 1 may be, e.g., a cyano group, a vinyl group, a propenyl group, an ethynyl group, or a propynyl group.

The additive, e.g., the compound represented by Chemical Formula 1, according to an embodiment may include, e.g., a compound represented by Chemical Formula 1A.

[Chemical Formula 1A]

In an implementation, the compound represented by Chemical Formula 1 may be included in an amount of, e.g., about 0.1 wt % to about 10 wt %, about 0.1 wt % to about 5.0 wt %, or about 0.2 wt % to about 2.0 wt %, or about 0.2 wt % to about 1.5 wt %, based on a total weight of the electrolyte for a rechargeable lithium battery.

When the compound represented by Chemical Formula 1 is included within the above range, a rechargeable lithium battery having improved cycle-life characteristics (by preventing an increase in resistance at a high temperature) may be realized, and simultaneously, a high temperature performance of the rechargeable lithium battery may be improved.

If the amount of the compound represented by Chemical Formula 1 were to be less than about 0.1 wt %, high-temperature storage characteristics may be deteriorated, and if it were to be greater than about 10 wt %, cycle-life may be decreased due to an increase in interface resistance.

The non-aqueous organic solvent may serve as a medium for transmitting ions taking part in the electrochemical reaction of a battery.

The non-aqueous organic solvent may include, e.g., a carbonate, ester, ether, ketone, alcohol, or aprotic solvent.

The carbonate solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include, e.g., methyl acetate, ethyl acetate, n-propyl acetate, dimethylacetate, methylpropionate, ethylpropionate, propyl propionate, γ-butyrolactone, decanolide, valerolactone, mevalonolactone, caprolactone, or the like. The ether solvent may include, e.g., dibutyl ether, tetraglyme, diglyme, dimethoxyethane, 2-methyltetrahydrofuran, tetrahydrofuran, or the like. The ketone solvent may include, e.g., cyclohexanone or the like. The alcohol solvent include, e.g., ethyl alcohol, isopropyl alcohol, or the like. The aprotic solvent may include, e.g., nitriles such as R—CN (wherein R is a C2 to C20 linear, branched, or cyclic hydrocarbon group, a double bond, an aromatic ring, or an ether bond), amides such as dimethylformamide, or dioxolanes such as 1,3-dioxolane, sulfolanes, or the like.

The non-aqueous organic solvent may be used alone or in a mixture. When the non-aqueous organic solvent is used in a mixture, their mixing ratio may be controlled in accordance with a desired battery performance.

The carbonate solvent may be prepared by mixing a cyclic carbonate and a linear carbonate. The cyclic carbonate and linear carbonate may be mixed together in a volume ratio of about 1:1 to about 1:9. When the mixture is used as an electrolyte, it may have enhanced performance.

The non-aqueous organic solvent may further include an aromatic hydrocarbon solvent as well as the carbonate solvent. The carbonate solvent and aromatic hydrocarbon solvent may be mixed together in a volume ratio of about 1:1 to about 30:1.

The aromatic hydrocarbon solvent may be an aromatic hydrocarbon compound represented by Chemical Formula 2.

[Chemical Fromula 2]

In Chemical Formula 2, $R^2$ to $R^7$ may each independently be, e.g., hydrogen, a halogen, a C1 to C10 alkyl group, a haloalkyl group, or a combination thereof.

Examples of the aromatic hydrocarbon solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 3 to help improve cycle-life.

[Chemical Fromula 3]

In Chemical Formula 3, $R^8$ and $R^9$ may each independently be, e.g., hydrogen, a halogen, a cyano group (CN), a nitro group ($NO_2$), or a C1 to C5 fluoroalkyl group. In an implementation, at least one of $R^8$ and $R^9$ may be a halogen, a cyano group (CN), a nitro group ($NO_2$), or a C1 to C5 fluoroalkyl group, and $R^8$ and $R^9$ are not simultaneously hydrogen.

Examples of the ethylene carbonate compound may include difluoro ethylenecarbonate, chloroethylene carbonate, dichloroethylene carbonate, bromoethylene carbonate, dibromoethylene carbonate, nitroethylene carbonate, cyanoethylene carbonate and fluoroethylene carbonate. The amount of the additive for improving cycle-life may be used within an appropriate range.

The lithium salt may be dissolved in the non-aqueous organic solvent, may supply a battery with lithium ions, may basically operate the rechargeable lithium battery, and may help improve transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers, for example, an integer selected from 1 to 20), LiCl, LiI, and $LiB(C_2O_4)_2$ (lithium bis(oxalato) borate; LiBOB). The lithium salt may be used in a concentration ranging from about 0.1M to about 2.0M. When the lithium salt is included at the above concentration range, an electrolyte may have excellent performance and lithium ion mobility due to optimal electrolyte conductivity and viscosity.

Another embodiment provides a rechargeable lithium battery including a positive electrode including a positive active material; a negative electrode including a negative active material; and the aforementioned electrolyte.

The positive electrode may include a current collector and a positive active material layer including a positive active material on the current collector.

The positive active material may include lithiated intercalation compounds that reversibly intercalate and deintercalate lithium ions.

In an implementation, a composite oxide of lithium and cobalt, manganese, nickel, or a combination thereof may be used.

Examples of the positive active material may include a compound represented by one of chemical formulae.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}$ $D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α <2); $Li_aNi_{1-b-c}Mn_bX_cD_\alpha$ (0.90≤a≤1.8, 0≤b≤0.5, 0≤c≤0.05, 0<α<2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8).

In the above chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E is selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The positive active material may include the positive active material with the coating layer, or a mixture of the positive active material and the positive active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include a suitable process that does not causes any side effects on the properties of the positive active material (e.g., spray coating, dipping).

An example of the positive active material may be a compound represented by Chemical Formula 4.

$$Li_{x1}M^1_{1-y1-z1}M^2_{y1}M^3_{z1}O_2 \qquad \text{[Chemical Formula 4]}$$

In Chemical Formula 4, x1, y1, and z1 may satisfy the following relations: 0.9≤x1≤1.8, 0≤y1≤1, 0≤z1≤1, 0≤y1+z1≤1. $M^1$, $M^2$, and $M^3$ may each independently be, e.g., Ni, Co, Mn, Al, Sr, Mg La, or a combination thereof.

In an implementation, the positive active material may include a composite oxide of lithium and cobalt, manganese, nickel, aluminum, or a combination thereof. In an implementation, the positive electrode active material according may be a compound of Chemical Formula 5.

$$Li_{x2}Ni_{y2}Co_{z2}Al_{1-y2-z2}O_2 \qquad \text{[Chemical Formula 5]}$$

In Chemical Formula 5, x2, y2, and z2 may satisfy the following relations: 1≤x2≤1.2, 0.6≤y2≤1, and 0≤z2≤0.5.

An amount of the positive active material may be about 90 wt % to about 98 wt %, based on a total weight of the positive active material layer.

In an implementation, the positive active material layer may include a binder and a conductive material. In an implementation, each amount of the binder and conductive material may be about 1 wt % to about 5 wt %, based on a total weight of the positive active material layer.

The binder may help improve binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to help improve electrode conductivity. A suitable electrically conductive material that does not cause a chemical change may be used as a conductive material. Examples of the conductive material may include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

In an implementation, the current collector may be, e.g., Al.

The negative electrode may include a current collector and a negative active material layer including a negative active material on the current collector.

The negative active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may include carbon materials. The carbon material may be a suitable carbon negative active material for a rechargeable lithium ion battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

The lithium metal alloy may include lithium and Na, K, Rb, Cs, Fr, Be, Mg, Ca, Sr, Si, Sb, Pb, In, Zn, Ba, Ra, Ge, Al, or Sn.

The material capable of doping and dedoping lithium may include Si, $SiO_x$ (0<x<2), a Si-Q alloy (in which Q is an alkali metal, an alkaline-earth metal, a Group 13 element, a Group 14 element, a Group 15 element, a Group 16 element, a transition metal, a rare earth element, or a combination thereof, and not Si), Sn, $SnO_2$, a Sn—R alloy (in which R is an alkali metal, an alkaline-earth metal, a Group 13 element, a Group 14 element, a Group 15 element, a Group 16 element, a transition element, a rare earth element, or a combination thereof, and not Sn), and the like. At least one of them may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or combination thereof.

The transition metal oxide may be, e.g., a vanadium oxide, a lithium vanadium oxide, or the like.

The negative active material according to an embodiment may include a Si—C composite including a Si active material and a carbon active material.

An average particle diameter of the Si active material may be about 50 nm to about 200 nm.

When the average particle diameter of the Si active material is within the above range, volume expansion occurring during charging and discharging may be suppressed, and a disconnection of a conductive path due to particle crushing during charging and discharging may be prevented.

The Si active material may be included in an amount of about 1 wt % to about 60 wt %, e.g., about 3 wt % to about 60 wt %, based on a total weight of the Si—C composite.

The negative active material according to another embodiment may further include crystalline carbon together with the aforementioned Si—C composite.

When the negative active material includes a Si—C composite and crystalline carbon together, the Si—C composite and crystalline carbon may be included in the form of a mixture, and in this case, the Si—C composite and crystalline carbon may be included in a weight ratio of about 1:99 to about 50:50. In an implementation, the Si—C composite and crystalline carbon may be included in a weight ratio of about 5:95 to about 20:80.

The crystalline carbon may include, e.g., graphite. In an implementation, the crystalline carbon may include, e.g., natural graphite, artificial graphite, or a mixture thereof.

The crystalline carbon may have an average particle diameter of about 5 μm to about 30 μm.

As used herein, the average particle diameter may be a particle size (D50) at a volume ratio of 50% in a cumulative size-distribution curve.

The Si—C composite may further include a shell surrounding the surface of the Si—C composite, and the shell may include amorphous carbon.

The amorphous carbon may include soft carbon, hard carbon, a mesophase pitch carbonization product, calcined coke, or a mixture thereof.

The amorphous carbon may be included in an amount of about 1 to about 50 parts by weight, e.g., about 5 to about 50 parts by weight or about 10 to about 50 parts by weight, based on 100 parts by weight of the carbon active material.

In the negative active material layer, the negative active material may be included in an amount of about 95 wt % to about 99 wt % based on a total weight of the negative active material layer.

In an implementation, the negative active material layer may include a binder, and optionally a conductive material. In the negative active material layer, the amount of the binder may be about 1 wt % to about 5 wt % based on a total weight of the negative active material layer. When it further includes the conductive material, it may include about 90 wt % to about 98 wt % of the negative active material, about 1 wt % to about 5 wt % of the binder, and about 1 wt % to about 5 wt % of the conductive material.

The binder may help improve binding properties of negative active material particles with one another and with a current collector. The binder may be a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a rubber binder or a polymer resin binder. The rubber binder may include a styrene-butadiene rubber, an acrylated styrene-butadiene rubber (SBR), an acrylonitrile-butadiene rubber, an acrylic rubber, a butyl rubber, a fluorine rubber, or a combination thereof. The polymer resin binder may include polytetrafluoroethylene, polyethylene, polypropylene, ethylenepropylene copolymer, polyethyleneoxide, polyvinylpyrrolidone, polyepichlorohydrin, polyphosphazene, polyacrylonitrile, polystyrene, an ethylene propylenediene copolymer, polyvinylpyridine, chlorosulfonatedpolyethylene, latex, a polyester resin, an acrylic resin, a phenolic resin, an epoxy resin, polyvinylalcohol, or a combination thereof.

When the water-soluble binder is used as the negative electrode binder, a cellulose compound may be further included to provide or adjust viscosity as a thickener. The cellulose compound may include carboxylmethyl cellulose, hydroxypropylmethyl cellulose, methyl cellulose, or alkali metal salts thereof. The alkali metal may be Na, K, or Li. Such a thickener may be included in an amount of about 0.1 to about 3 parts by weight based on 100 parts by weight of the negative active material.

The conductive material is included to provide electrode conductivity. A suitable electrically conductive material that does not cause a chemical change may be used as a conductive material. Examples thereof may include a carbon material such as natural graphite, artificial graphite, carbon black, acetylene black, ketjen black, carbon fiber and the like; a metal material such as a metal powder or a metal fiber and the like of copper, nickel, aluminum, silver, and the like; a conductive polymer such as a polyphenylene derivative and the like; or a mixture thereof.

The current collector may include a copper foil, a nickel foil, a stainless steel foil, a titanium foil, a nickel foam, a copper foam, a polymer substrate coated with a conductive metal, or a combination thereof.

The rechargeable lithium battery may further include a separator between the negative electrode and the positive electrode, depending on a type of the rechargeable lithium battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
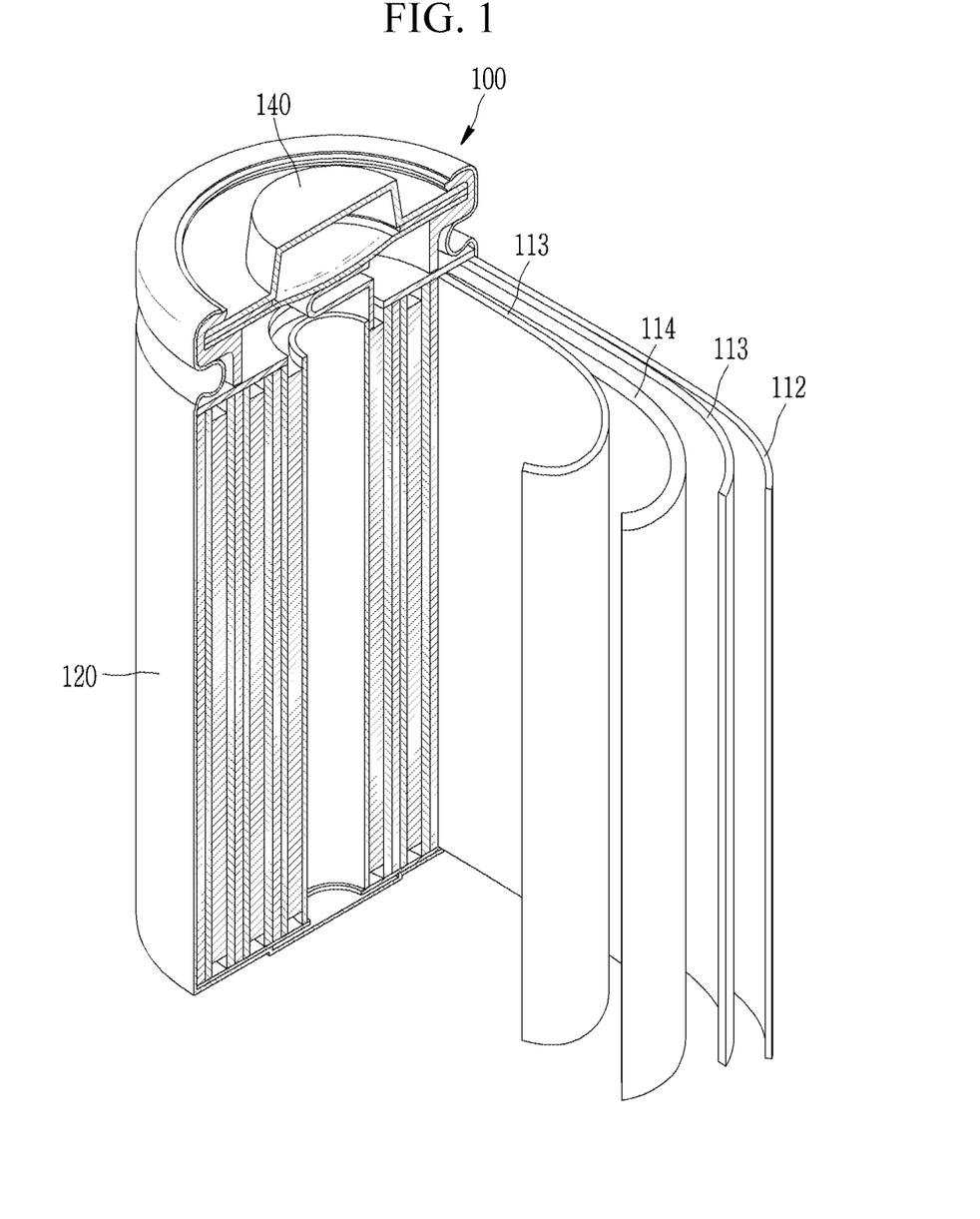
FIG. 1 is an exploded perspective view of a rechargeable lithium battery according to an embodiment.

Referring to FIG. 1, a rechargeable lithium battery 100 according to one embodiment may include a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114, and the separator 113, a battery case 120 housing the battery cell, and a sealing member 140 sealing the battery case 120.

The following Examples and Comparative Examples are provided in order to highlight characteristics of one or more embodiments, but it will be understood that the Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Production of Rechargeable Lithium Battery Cells

Synthesis Example: Synthesis of Lithium Vinylphosophonate (VPLi)

Vinylphosphonic acid (VPA, 0.1 g, 1.02 mmol) was added to 5 ml of anhydrous dimethyl carbonate in which LiH (0.03 g, 3.8 mmol) was dissolved under an Ar atmosphere. The reaction mixture was stirred for 1 hour and filtered to remove residual LiH to obtain a target product represented by Chemical Formula 1A.

[Chemical Formula 1A]

$^{31}$P NMR (300 MHz, DMSO): δ 9.60 (s, 1P).

Figure 4:
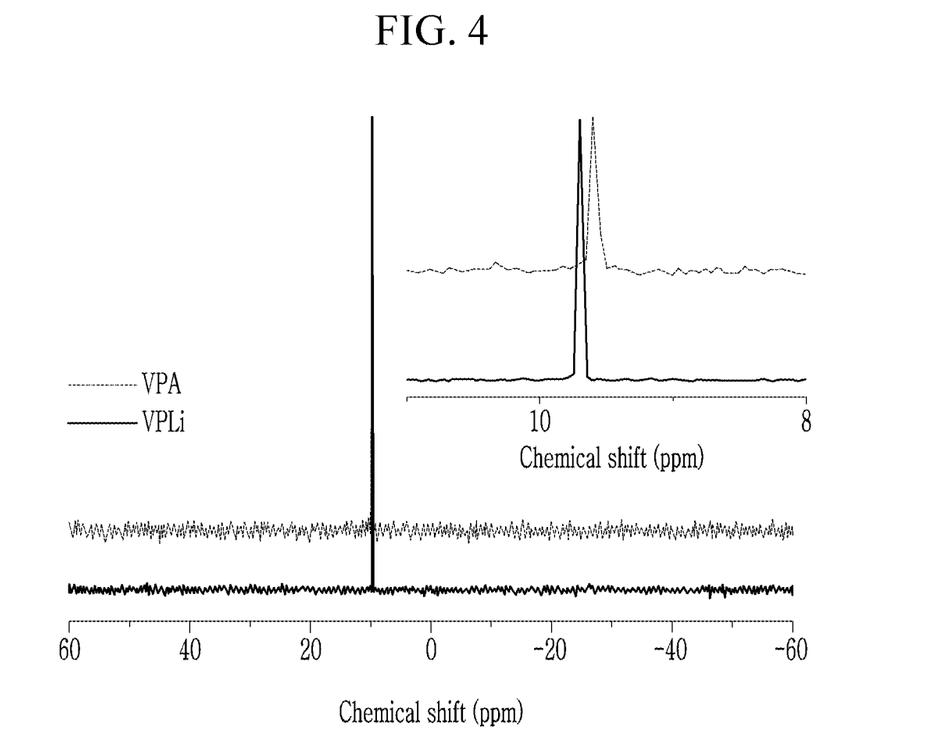
FIG. 4 shows a P-NMR spectrum for the additive compound according to the Synthesis Example.

FIG. 4 shows P-NMR spectrum for the additive compound according to the Synthesis Example.

Referring to FIG. 4, a chemical shift of P-NMR spectrum of the reactant of vinylphosphonic acid (VPA) confirmed a product of lithium vinylphosophonate (VPLi).

Comparative Synthesis Example: Compound Represented by Chemical Formula b

Phenoxycarbonylphosphonic acid (1 mmol) was added to 10 ml of anhydrous dimethyl carbonate in which LiH (3 mmol) was dissolved under an Ar atmosphere. The reaction mixture was stirred for 2 hours and then, filtered to remove residual LiH to obtain a target product represented by Chemical Formula b.

[Chemical Formula b]

$^{31}$P NMR (300 MHz, DMSO): A chemical shift occurs from δ -3.40 (s, 1P) to δ -3.90 (s, 1P).

Example 1

LiNi$_{0.88}$Co$_{0.105}$Al$_{0.015}$O$_2$ as a positive active material, polyvinylidene fluoride as a binder, and carbon black as a conductive material were mixed respectively in a weight ratio of 98:1:1 and then, dispersed in N-methyl pyrrolidone to prepare positive active material slurry.

The positive active material slurry was coated to be 20 μm thick on an Al foil, dried at 100° C., and pressed to manufacture a positive electrode.

A mixture of artificial graphite and Si—C composite in a weight ratio of 89:11 was prepared as a negative active material, and the negative active material, a styrene-butadiene rubber as a binder, and carboxylmethyl cellulose (as a viscosity adjuster) in a weight ratio of 98:1:1 were dispersed in distilled water to prepare negative active material slurry.

The Si—C composite had a core including artificial graphite and silicon particles and coal pitch coated on the surface of the core, a content of the silicon was 3 wt % based on a total weight of the Si—C composite.

The negative active material slurry was coated on a 10 μm-thick Cu foil, dried at 100° C., and pressed to manufacture a negative electrode.

The manufactured positive and negative electrodes, a 25 μm-thick polyethylene separator, and an electrolyte were used to manufacture a rechargeable lithium battery cell.

The electrolyte had the following composition.

(Electrolyte Composition)

Salt: 1.15M LiPF$_6$

Solvent: ethylene carbonate: methylethyl carbonate:dimethyl carbonate (EC: MEC:DMC=volume ratio of 2:4:4)

Additive: 1 wt % of compound represented by Chemical Formula 1A (in the electrolyte composition, "wt %" is based on a total weight of the electrolyte (the lithium salt+the non-aqueous organic solvent+the additive))

Example 2

A rechargeable lithium battery cell was manufactured according to the same method as Example 1 except that the content of the additive was changed to 0.5 wt %.

Example 3

A rechargeable lithium battery cell was manufactured according to the same method as Example 1 except that the content of the additive was changed to 0.2 wt %.

Comparative Example 1

A rechargeable lithium battery cell was manufactured according to the same method as Example 1 except that the additive was not included.

Comparative Example 2

A rechargeable lithium battery cell was manufactured according to the same method as Example 1 except that 1 wt % of fluoroethylene carbonate as the additive was included, instead of the compound represented by Chemical Formula 1A.

Comparative Example 3

A rechargeable lithium battery cell was manufactured according to the same method as Example 1 except that the additive was a compound represented by Chemical Formula b, instead of the compound represented by Chemical Formula 1A.

Evaluation of Cell Characteristics

Evaluation 1: Evaluation of Initial Resistance

The cells according to Examples 1 to 3 and Comparative Examples 1 to 3 were charged at 4 A and 4.2 V and cut off at 100 mA and then, paused for 30 minutes at 25° C. Subsequently, the cells were discharged respectively at 10 A for 10 second, at 1 A for 10 seconds, and at 10 A for 4 seconds, and then, currents and voltages of the cells were measured at each point of 18 seconds and 23 seconds to calculate initial resistances (differences of the resistance at the points of 18 seconds and 23 seconds) according to ΔR=ΔV/ΔI. The results are shown in Tables 1 and 2.

Evaluation 2: Evaluation of High Rate Capability

The rechargeable lithium battery cells according to Examples 1 to 3 and Comparative Examples 1 to 3 were charged at a constant current (0.1 C) and a constant voltage (1.0 V, 0.01 C cut-off), paused for 10 minutes, and discharged down to 2.5 V by changing the constant current into 0.2 C, 1.0 C, 2.0 C, and 5.0 C to evaluate high rate discharge characteristics (rate capability). The results are shown in Tables 1 and 2.

Evaluation 3: Evaluation of Room Temperature Cycle-Life Characteristics

The rechargeable lithium battery cells according to Examples 1 to 3 and Comparative Examples 1 to 3 were charged and discharged 250 times by constant current-constant voltage-charging at 1 C, cut-offing at 4.2 V and 0.05 C, and discharging to 3.0 V at a constant current of 1.0 C at 25° C. to measure discharge capacity at each cycle, and capacity retention at the 200$^{th}$ cycle with respect to discharge capacity at the 1$^{st}$ was calculated. The results are shown in Tables 1 and 2.

TABLE 1

| | Initial resistance | High rate capability (%) | | | | 25° C. cycle-life characteristics |
|---|---|---|---|---|---|---|
| | (mΩ) | 0.2 C | 1.0 C | 2.0 C | 5.0 C | (%, @200 cy) |
| Example 1 | 19.2 | 100 | 91 | 80 | 69 | 84.8 |
| Comparative Example 1 | 17.5 | 100 | 89 | 75 | 58 | 79.1 |
| Comparative Example 2 | 18.7 | 100 | 90 | 77 | 61 | 83.9 |
| Comparative Example 3 | 21.4 | 100 | 91 | 78 | 63 | 91.3 |

TABLE 2

| | Initial resistance | High rate capability (%) | | | | 25° C. cycle-life characteristics |
|---|---|---|---|---|---|---|
| | (mΩ) | 0.2 C | 1.0 C | 2.0 C | 5.0 C | (%, @200 cy) |
| Example 1 | 19.2 | 100 | 91 | 80 | 69 | 84.8 |
| Example 2 | 18.3 | 100 | 92 | 80 | 67 | 84.0 |
| Example 3 | 17.8 | 100 | 90 | 78 | 59 | 82.1 |

Referring to Table 1, the rechargeable lithium battery cell of Example 1 including the compound represented by Chemical Formula 1A as an additive exhibited low initial resistance, compared with the cell of Comparative Example 3 including the compound represented by Chemical Formula b as an additive. The reason may be that the initial SEI film was efficiently formed and prevented a side reaction of the negative electrode and the electrolyte.

In addition, the rechargeable lithium battery cell of Example 1 had excellent high rate capability compared with the rechargeable lithium battery cells of Comparative Examples 1 to 3.

In addition, the rechargeable lithium battery cell of Example 1 exhibited improved recovery capacity compared with the rechargeable lithium battery cell of Comparative Example 1 (including no additive) and the cell of Comparative Example 2 (including fluoroethylene carbonate as an additive).

As may be seen in Table 2, the rechargeable lithium battery cells of Examples 1 to 3 helped reduce initial resistance and realized excellent cycle-life characteristic and high rate capability.

By way of summation and review, an electrolyte may include an organic solvent in which a lithium salt is dissolved, and may determine stability and performance of a rechargeable lithium battery.

LiPF$_6$ may be used as a lithium salt of an electrolyte, and may react with an electrolytic solvent to promote depletion of a solvent and generate a large amount of gas. When LiPF$_6$ is decomposed, it generates LiF and PF$_5$, which leads to electrolyte depletion in the battery, resulting in degradation in high temperature performance and poor safety.

One or more embodiments may provide an electrolyte which suppresses side reactions of such a lithium salt and improves the performance of the battery.

One or more embodiments may provide an electrolyte for a rechargeable lithium battery capable of securing high rate capability by lowering initial resistance and improving cycle-life characteristics.

One or more embodiments may provide a rechargeable lithium battery having a lower initial resistance and improved high rate capability and improved cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   a non-aqueous organic solvent;
   a lithium salt; and
   an additive,
   wherein:
   the additive includes a compound represented by Chemical Formula 1:

[Chemical Formula 1]

in Chemical Formula 1, R$^1$ is an unsubstituted C2 to C10 alkenyl group or an unsubstituted C2 to C10 alkynyl group, and
   the compound represented by Chemical Formula 1 is included in an amount of about 0.2 wt % to about 1.5 wt %, based on a total weight of the electrolyte.

2. The electrolyte as claimed in claim 1, wherein R$^1$ an unsubstituted C2 to C4 alkenyl group or an unsubstituted C2 to C4 alkynyl group.

3. The electrolyte as claimed in claim 1, wherein R$^1$ is a vinyl group, a propenyl group, an ethynyl group, or a propynyl group.

4. The electrolyte as claimed in claim 1, wherein the compound represented by Chemical Formula 1 is represented by Chemical Formula 1A:

[Chemical Formula 1A]

5. A rechargeable lithium battery, comprising
a positive electrode including a positive active material;
a negative electrode including a negative active material; and
the electrolyte as claimed in claim 1.

6. The rechargeable lithium battery as claimed in claim 5, wherein the positive active material includes a composite oxide of lithium and cobalt, manganese, nickel, or a combination thereof.

7. The rechargeable lithium battery as claimed in claim 5, wherein:
the positive active material is represented by Chemical Formula 4:

$$Li_{x1}M^1_{1-y1-z1}M^2_{y1}M^3_{z1}O_2$$ [Chemical Formula 4]

in Chemical Formula 4,
x1, y1, and z1 satisfy the following relations: $0.9 \leq x1 \leq 1.8$, $0 \leq y1 \leq 1$, $0 \leq z1 \leq 1$, and $0 \leq y1+z1 \leq 1$, and
$M^1$, $M^2$ and $M^3$ are each independently Ni, Co, Mn, Al, Sr, Mg, La, or a combination thereof.

8. The rechargeable lithium battery as claimed in claim 5, wherein:
the positive active material is represented by Chemical Formula 5:

$$Li_{x2}Ni_{y2}Co_{z2}Al_{1-y2-z2}O_2$$ [Chemical Formula 5]

in Chemical Formula 5, x2, y2, and z2 satisfy the following relations: $1 \leq x2 \leq 1.2$, $0.6 \leq y2 \leq 1$, and $0 \leq z2 \leq 0.5$.

9. The rechargeable lithium battery as claimed in claim 5, wherein the negative active material includes a Si-C composite including a Si active material and a carbon active material.

10. The rechargeable lithium battery as claimed in claim 9, wherein the negative active material further includes crystalline carbon.

11. The rechargeable lithium battery as claimed in claim 10, wherein:
the crystalline carbon includes graphite, and
the graphite includes natural graphite, artificial graphite, or a mixture thereof.

12. The rechargeable lithium battery as claimed in claim 9, wherein
the Si-C composite further includes a shell surrounding a surface of the Si-C composite, and
the shell includes amorphous carbon.

13. The rechargeable lithium battery as claimed in claim 12, wherein the amorphous carbon includes soft carbon, hard carbon, a mesophase pitch carbonization product, calcined coke, or a mixture thereof.

14. The rechargeable lithium battery as claimed in claim 5, wherein the compound represented by Chemical Formula 1 is represented by Chemical Formula 1A:

[Chemical Formula 1A]

* * * * *